May 13, 1941. A. G. EWERTH 2,242,025

SHARE FOR SOWING MACHINES

Filed July 20, 1938

INVENTOR:
ANTON GEORG EWERTH
BY Haseltine, Lake & Co.
ATTORNEYS

Patented May 13, 1941

2,242,025

UNITED STATES PATENT OFFICE 2,242,025

SHARE FOR SOWING MACHINES

Anton Georg Ewerth, Stocksund, Sweden, assignor to Erik Vilhelm Walter Hallwyl Von Geijer, Stockholm, Sweden Application July 20, 1938, Serial No. 220,172

3 Claims. (Cl. 97—225)

The present invention is founded on the knowledge that the sowing-depth for corn has influence on the time after which the corn shoots up and thus also on the time of maturity thereof so that a greater sowing-depth causes a later shooting-up and maturity than a less sowing-depth. In other words, if the sowing has been performed with a varying sowing-depth, the harvest will be uneven and contain both corn which is completely mature and corn that is more or less immature.

Taking this knowledge as a starting point the invention has for its object to provide such steps at sowing that the sowing-depth becomes constant to the most possible extent.

It is a true and well-known matter that modern drills as compared with broad-drills have that advantage of effecting a considerably more even sowing-depth but, generally, also the well-known drills are constructed so as to be unable to effect a constant sowing-depth under all circumstances. In drills of known constructions the sowing-feet or shares are usually constructed as spoons having a more or less broad front or as sharp knives which root the ground to form a groove or furrow for the corn, and, primarily, the work-depth for said spoons or knives is determined by the resistance afforded to the share by the more or less loose soil it has to pierce. Also sowing-feet in the form of weighted or spring-actuated rockers occur but the operation of such shares is also to a great extent dependent upon the varying state of the ground.

The invention relates to shares for drills, and particularly to the type which is adapted to be dragged on the ground and is loaded for depressing the share proper into the ground, and according to the invention the share is characterized by the fact that the share comprises a carrying member and a projection provided on the bottom surface thereof, both the longitudinal and the transverse section of said projection having a contour that begins and terminates at the bottom of the carrying member and forms a continuous curved line, whereby the share impresses an even open furrow into the ground when advanced thereon.

For illustrative purpose an embodiment of the share is shown in the accompanying drawing which refers to a share which is especially adapted for drills of the type referred to in the copending United States patent application No. 241,304, i. e. drills without guide tubes and provided with a discharge device which lays the corn directly in a furrow previously made.

Figure 1:
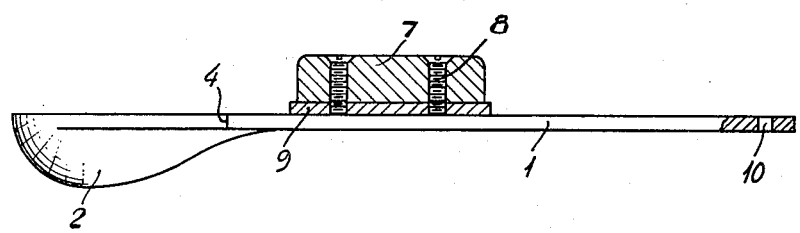
Fig. 1 is a part sectional side elevation of the share.
Figure 2:
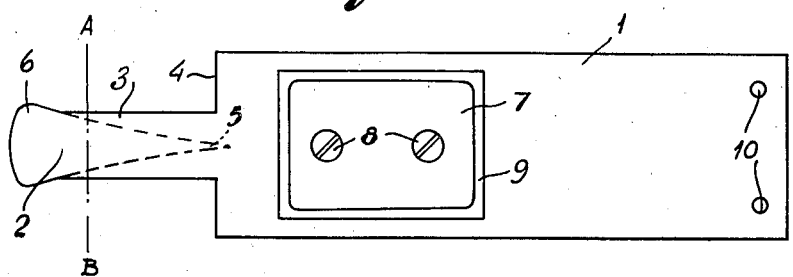
Fig. 2 is a top view of the share.

With reference to the drawing the share means consists of a plate 1 and the share member proper 2 which is secured to the plate at one end thereof. With reference to the position the plate 1 takes during operation the share proper is disposed on the lower side of the plate. The end 3 of the plate 1 carrying a projection 2 forming the share member proper is narrower than the remainder of the plate, and formed at the limit between the narrower portion and the wider one is an abutment surface or shoulder 4 which is adapted to limit the work-depth of the share. This abutment or shoulder extends laterally beyond the maximum width of the projection 2 and is situated substantially in alignment with the front end of the projection as looked in the direction in which the share is advanced. It will be noted that the terminal portion 3 is relatively narrow and does not project beyond the maximum width of the projection 2, the object being to prevent the terminal portion from rendering the penetration of the share to the desired depth into the ground more difficult.

Figure 3:
Fig. 3 is an inverted sectional view on line A—B of Fig. 2.

As shown in Fig. 1, the projection 2 has a boat-like side-face or profile the front end or point thereof, however, being merged into the lower side of the plate whereby to prevent said end of the share from being caught by solid bars, stones, roots or the like in the ground. The projection has its fore end extended to a tapering point 5 the greatest width of the projection 2 being at the rounded rear portion 6 thereof. The cross section of the projection 2 is rounded off as shown in Figure 3.

The share may be provided with suitable means to enable loading thereof so as to maintain the projection depressed into the ground to the depth required during operation. These means may consist of weights actuating the plate 1 or spring means acting thereupon. In the embodiment shown in the drawing the plate carries a weight 7 which is secured to a clamping plate 9 by screws 8, said clamping plate being welded on the top of the plate 1 and comprising holes in which the ends of the screws are introduced.

The end of the plate 1 opposite to the projection 2 has holes 10 to enable suspension of the plate by means of links (not shown) or other means in a sowing machine.

Figure 4:
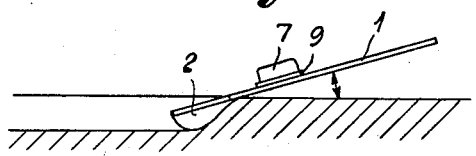
Fig. 4 illustrates, on a reduced scale, the position of the share relatively to the ground during operation.
Figure 5:
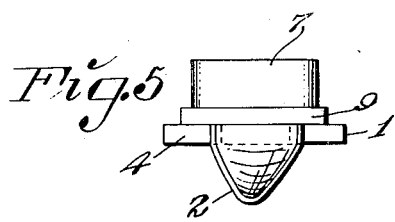
Fig. 5 is a rear view of the share.

During operation the share is advanced in a position inclined to the ground as indicated in Figure 4. The suspension means for the connection of the share to the sowing machine may be constructed so as to permit adjustment of the angle of inclination whereby the work-depth may be changed to a certain extent. The load on the share plate 1 causes the share to penetrate into the ground until the shoulder 4 engages with the ground surface and is dragged therealong. As a result the share will follow the contour of the ground so as to effect a constant or approximately constant work-depth in spite of more or less marked swells or depressions in the ground. Due to the rounded and boat-like shape of the projection the furrow made thereby is even and smooth which assists the individual corns dropping thereinto to take a position in the deepest portion of the furrow, i. e. at the middle thereof.

A particular advantage is afforded by the rounded rear end of the projection because such shape prevents the share from penetrating into the ground if the machine is driven back.

What I claim is:

1. A share for drill sowing machines, of the type which is adapted to be advanced while dragging on the ground and is loaded for depressing the share proper into the ground, characterized by the fact that the share comprises a carrying member and a projection disposed on the bottom surface thereof, both the longitudinal and the transverse section of said projection having a contour or profile as seen from the side, that begins and terminates at the bottom of the carrying member and forms a continuous curved line, so that the share is effective to press an even open furrow in the ground when advanced thereon.

2. A share for drill sowing machines, comprising a loaded plate, a smaller rear end portion on said plate, a continuously rounded projection provided on the lower side of said rear plate portion, a shoulder at the limit between said smaller end portion and the remainder of the plate serving to engage the surface of the ground and thereby limit the depth to which the projection is depressed into the ground when the share is advanced thereon.

3. In a share for drill sowing machines, a carrying member, a projection on the lower side of said carrying member, the forward end of said projection forming an extended point merging in the lower side of the carrying member, the rear end of the projection being rounded and having the broadest portion at its rear end, and a shoulder on said carrying member serving to limit the working depth to which the projection is depressed into the ground when the share is advanced thereon.

ANTON GEORG EWERTH.